United States Patent
Ayyagari et al.

(10) Patent No.: US 10,926,407 B2
(45) Date of Patent: Feb. 23, 2021

(54) MOVEMENT CONTROL FOR TRACKED ROBOT ASSEMBLIES THAT MANUFACTURE AIRCRAFT

(71) Applicant: The Boeing Company, Chicago, IL (US)

(72) Inventors: Arun Ayyagari, Seattle, WA (US); Thi Q Nguyen, Everett, WA (US); Ngoc S Le, Renton, WA (US); Bally Bang, Seattle, WA (US); Wen Xin Wang, Bothell, WA (US); David H Amirehteshami, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 383 days.

(21) Appl. No.: 15/245,589

(22) Filed: Aug. 24, 2016

(65) Prior Publication Data
US 2018/0056511 A1  Mar. 1, 2018

(51) Int. Cl.
| | |
|---|---|
| *B25J 9/16* | (2006.01) |
| *B25J 9/00* | (2006.01) |
| *B25J 11/00* | (2006.01) |
| *B25J 19/02* | (2006.01) |
| *B64F 5/10* | (2017.01) |
| *B25J 5/00* | (2006.01) |

(52) U.S. Cl.
CPC ............. *B25J 9/162* (2013.01); *B25J 5/005* (2013.01); *B25J 9/0084* (2013.01); *B25J 9/1687* (2013.01);
(Continued)

(58) Field of Classification Search
CPC ...... B64F 5/00; B64F 5/10; B64F 5/50; Y10S 901/01; Y10S 901/46; Y10S 901/41;
(Continued)

(56) References Cited

U.S. PATENT DOCUMENTS

| | | | | |
|---|---|---|---|---|
| 5,942,869 A | * | 8/1999 | Katou | ........................ B25J 5/00 318/568.12 |
| 2012/0304579 A1 | | 12/2012 | Dezoete | |

(Continued)

FOREIGN PATENT DOCUMENTS

| | | |
|---|---|---|
| CA | 2894306 A1 | 1/2016 |
| EP | 2522573 A2 | 11/2012 |

(Continued)

OTHER PUBLICATIONS

Continuous track: Wikipedia, the free encyclopedia, available at https://en.wikipedia.org/wiki/Continuous_track, Jun. 27, 2016.
(Continued)

*Primary Examiner* — Charles J Han
(74) *Attorney, Agent, or Firm* — Duft & Bornsen, PC

(57) ABSTRACT

Systems and methods are provided for controlling the motion of a tracked robot assembly. An exemplary method comprises disposing a mobile robot assembly proximate to a fuselage of an aircraft that is being assembled, aligning a left ranging sensor of the assembly with a left target, and aligning a right ranging sensor of the assembly with a right target. The method also includes directing the assembly to traverse to a location within the aircraft fuselage at which a robot on the assembly will perform work upon the fuselage, determining a left distance between the left ranging sensor and the left target while the assembly is moving, determining a right distance between the right ranging sensor and the right target while the assembly is moving, detecting a difference between the determined distances, and adjusting a direction of motion of the assembly based on the difference.

20 Claims, 15 Drawing Sheets

(52) U.S. Cl.
CPC .............. *B25J 11/005* (2013.01); *B25J 19/02* (2013.01); *B64F 5/10* (2017.01); *Y10S 901/01* (2013.01); *Y10S 901/46* (2013.01)

(58) Field of Classification Search
CPC ... Y10S 901/44; B23B 2215/04; B23B 41/00; B23P 19/06; B23Q 1/035; B23Q 1/621; B23Q 2210/008; B23Q 3/15513; B23Q 3/15536; B23Q 7/04; B23Q 9/0007; B23Q 9/0042; B23Q 9/02; B25J 11/005; B25J 11/007; B25J 13/089; B25J 15/0052; B25J 15/0491; B25J 19/02; B25J 5/005; B25J 5/007; B25J 5/04; B25J 9/0018; B25J 9/0084; B25J 9/026; B25J 9/162; B25J 9/1687; B62D 57/024; B66C 19/005; B66C 5/02; G05B 19/182; G05B 19/19; G05B 19/402; G05B 2219/45055; G05B 2219/45059; Y02P 90/86; Y10T 29/49; Y10T 29/49622; Y10T 29/49826; Y10T 29/49828; Y10T 29/4989; Y10T 29/50; Y10T 29/5107; Y10T 29/5146; Y10T 29/5173; Y10T 29/53961; Y10T 29/53991; Y10T 29/54; Y10T 408/03; Y10T 408/05; Y10T 408/55; Y10T 408/554

See application file for complete search history.

(56) References Cited

U.S. PATENT DOCUMENTS

| | | | |
|---|---|---|---|
| 2015/0134104 A1* | 5/2015 | Dorsey-Palmateer | ............... G01B 21/042 700/186 |
| 2016/0008869 A1 | 1/2016 | Oberoi et al. | |
| 2016/0008981 A1 | 1/2016 | Oberoi et al. | |
| 2016/0009416 A1 | 1/2016 | Oberoi et al. | |
| 2016/0009419 A1 | 1/2016 | Oberoi et al. | |
| 2016/0009420 A1 | 1/2016 | Oberoi et al. | |
| 2016/0009421 A1 | 1/2016 | Oberoi et al. | |
| 2016/0009422 A1 | 1/2016 | Oberoi et al. | |
| 2016/0011593 A1 | 1/2016 | Oberoi et al. | |

FOREIGN PATENT DOCUMENTS

| | | |
|---|---|---|
| EP | 2532589 A2 | 12/2012 |
| EP | 2889222 A1 | 7/2015 |
| JP | 2015094762 A | 5/2015 |
| JP | 2016016860 A | 2/2016 |
| WO | 9813169 | 4/1998 |

OTHER PUBLICATIONS

Richard O. Duda, Peter E. Hart, David G. Stork; Pattern Classification, 2nd Edition, Chapter 3, pp. 16-19, ISBN 978-0-471-05669-0; Nov. 2000.

Trevor Hustle, Robert Tibshirani, Jerome Friedman; The Elements of Statistical Learning; Data Mining, Inference, and Prediction, Springer Series in Statisics, 267-272, 2nd ed. 2009. Corr. 7th printing 2013 Edition.

Simultaneous localization and mapping; Wikipedia, the free encyclopedia, available at https://en.wikipedia.org/wiki/Simultaneous_localization_and_mapping Jun. 27, 2016.

Douhet, Herve, European Search Report—Application 17172022.0-1754, dated Nov. 7, 2017, Munich.

Canadian office action; Application 2969776; dated Sep. 3, 2020.

European Search Report; Application EP19217315; dated May 13, 2020.

* cited by examiner

SIDE

MOVEMENT CONTROL FOR TRACKED ROBOT ASSEMBLIES THAT MANUFACTURE AIRCRAFT

FIELD

The present disclosure relates generally to aircraft and, in particular, to utilizing robots to manufacture/fabricate an aircraft.

BACKGROUND

Building a fuselage for an aircraft may include attaching skin panels to a support structure that provides structural rigidity. For example, the support structure may include hoop-wise frames and longitudinal elongated stringers, to which skin panels are attached. Together, the combination of skin panels and support structure defines a portion of the airframe of the aircraft.

Fastening operations and/or other work may be performed to join the skin panels and the support members together to form the fuselage. These operations may include, for example, drilling operations, riveting operations, interference-fit bolting operations, inspection, etc. Such operations may be performed in order to ensure that the fuselage meets outer mold line (OML) requirements and inner mold line (IML) requirements.

Within a manufacturing environment (e.g., a factory floor, a manufacturing cell, etc.), robots may be utilized to perform the operations described above for a fuselage. The robots are placed onto assemblies that are expected to move predictably, accurately, and repeatably within the fuselage in accordance with a Numerical Control (NC) program in order to perform operations at precise locations on the fuselage (e.g., locations within the fuselage).

The assembly process for such robots unfortunately remains a complicated process. Since the robots are actively assembling the fuselage, the fuselage often lacks a solid floor. Even in embodiments where a solid floor exists on the fuselage during manufacturing, it may be undesirable to traverse a large and heavy robot assembly across such a floor. Thus, a temporary floor may be assembled from a variety of temporary floor boards inserted between joists and beams framing a floor within the fuselage. These temporary floor boards may shift slightly when driven upon by an assembly, causing the assembly to deviate from expected positions each time it moves. Effectively, the slipping of the floor boards due to the track causes the assembly to remain in place when the assembly expects to be moving forward. If temporary floor boards for different tracks slip by different amounts, the assembly may even change its direction, compounding the amount of error in location as the assembly proceeds forward/aftward. Hence, operators continue to desire enhanced robotic systems that account for and/or minimize undesired movements/motion, thereby ensuring more accurate fuselage assembly.

SUMMARY

Embodiments described herein structurally unite temporary floor boards underneath a mobile tracked robot assembly, and proceed to utilize metrology to ensure that the assembly moves as desired. If the assembly deviates from an intended location while moving, the systems described herein may utilize closed loop and/or open loop control mechanisms to re-orient and/or reposition the assembly, even while the assembly is still moving.

One embodiment is a method comprising disposing a mobile robot assembly proximate to a fuselage of an aircraft that is being assembled, aligning a left ranging sensor of the assembly with a left target, and aligning a right ranging sensor of the assembly with a right target. The method also includes directing the assembly to traverse to a location within the aircraft fuselage at which a robot on the assembly will perform work upon the fuselage, determining a left distance between the left ranging sensor and the left target while the assembly is moving, determining a right distance between the right ranging sensor and the right target while the assembly is moving, detecting a difference between the determined distances, and adjusting a direction of motion of the assembly based on the difference.

A further embodiment is a system comprising a fuselage of an aircraft that is being assembled, a temporary floor comprising multiple floor boards that cover joists and beams of the fuselage and are coupled with each other via mechanical interlock mechanisms, a workstand that includes reflective targets, and an assembly that is disposed on the workstand and performs operations on the fuselage. The assembly comprises multiple ranging sensors that each measure a distance to a corresponding target at the workstand, and a controller that detects a difference between the distances measured by the sensors while the assembly is moving, and changes a direction of motion of the assembly based on the difference in order to drive the assembly to a new position within the fuselage.

A further embodiment is a method. The method comprises installing temporary floor boards into a fuselage of an aircraft that is being assembled, identifying paths over which tracks of a tracked robot assembly will travel across the temporary floor boards within the fuselage during assembly of the fuselage, identifying a set of floor boards corresponding to each of the paths, and for each set of floor boards, installing mechanical interlock mechanisms that structurally unite the sets of floor boards into a rigid body along the identified paths.

A further embodiment is a non-transitory computer readable medium embodying programmed instructions which, when executed by a processor, are operable for performing a method of adjusting a position of a tracked robot assembly operating within an aircraft fuselage. The method comprises measuring distances between sensors on the assembly and corresponding targets external to the assembly, detecting differences in distance between the distances measured by the sensors, and steering the assembly based on the differences in distance.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
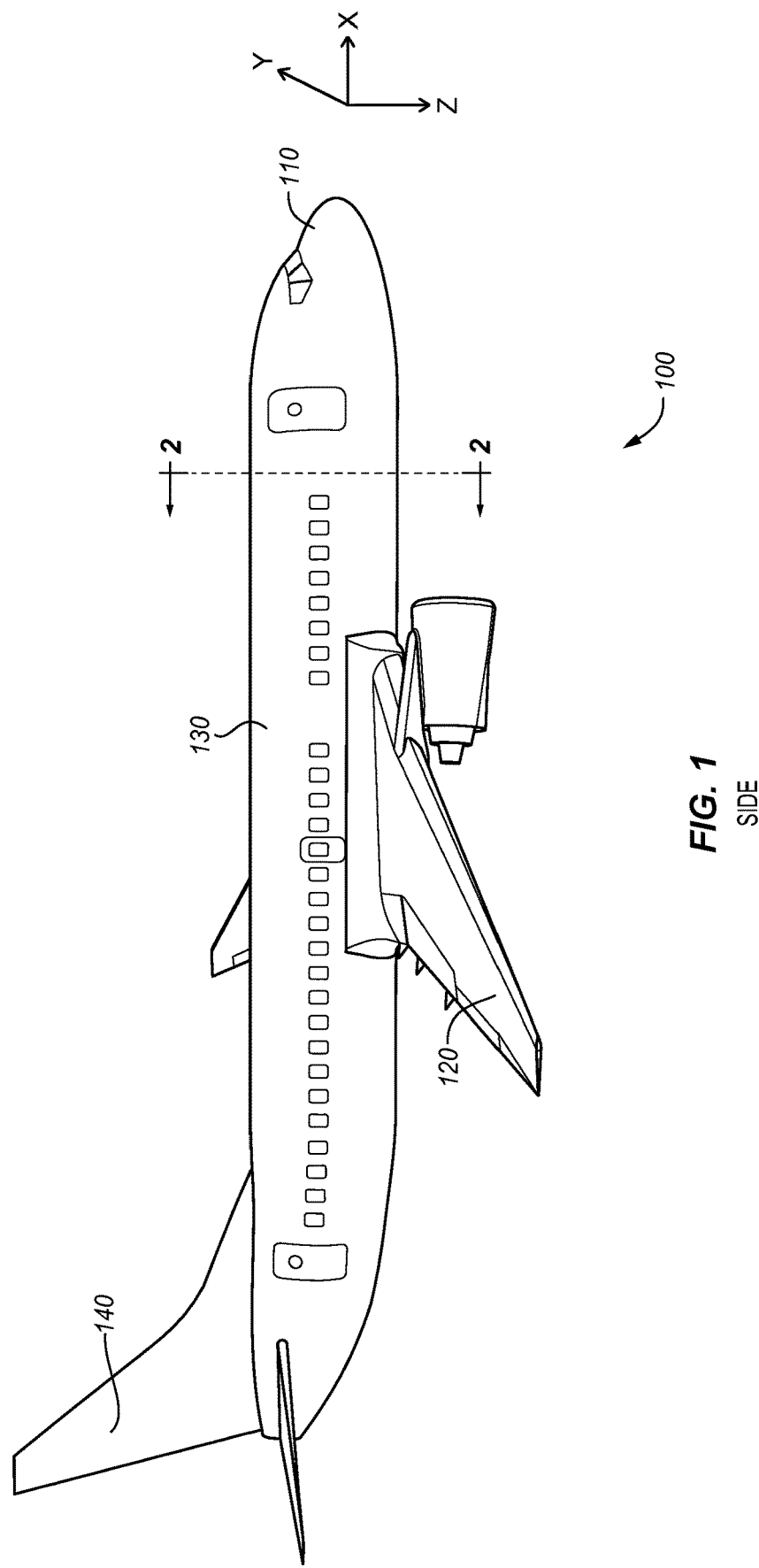
FIG. 1 is a block diagram of an aircraft in an exemplary embodiment.
Figure 2:
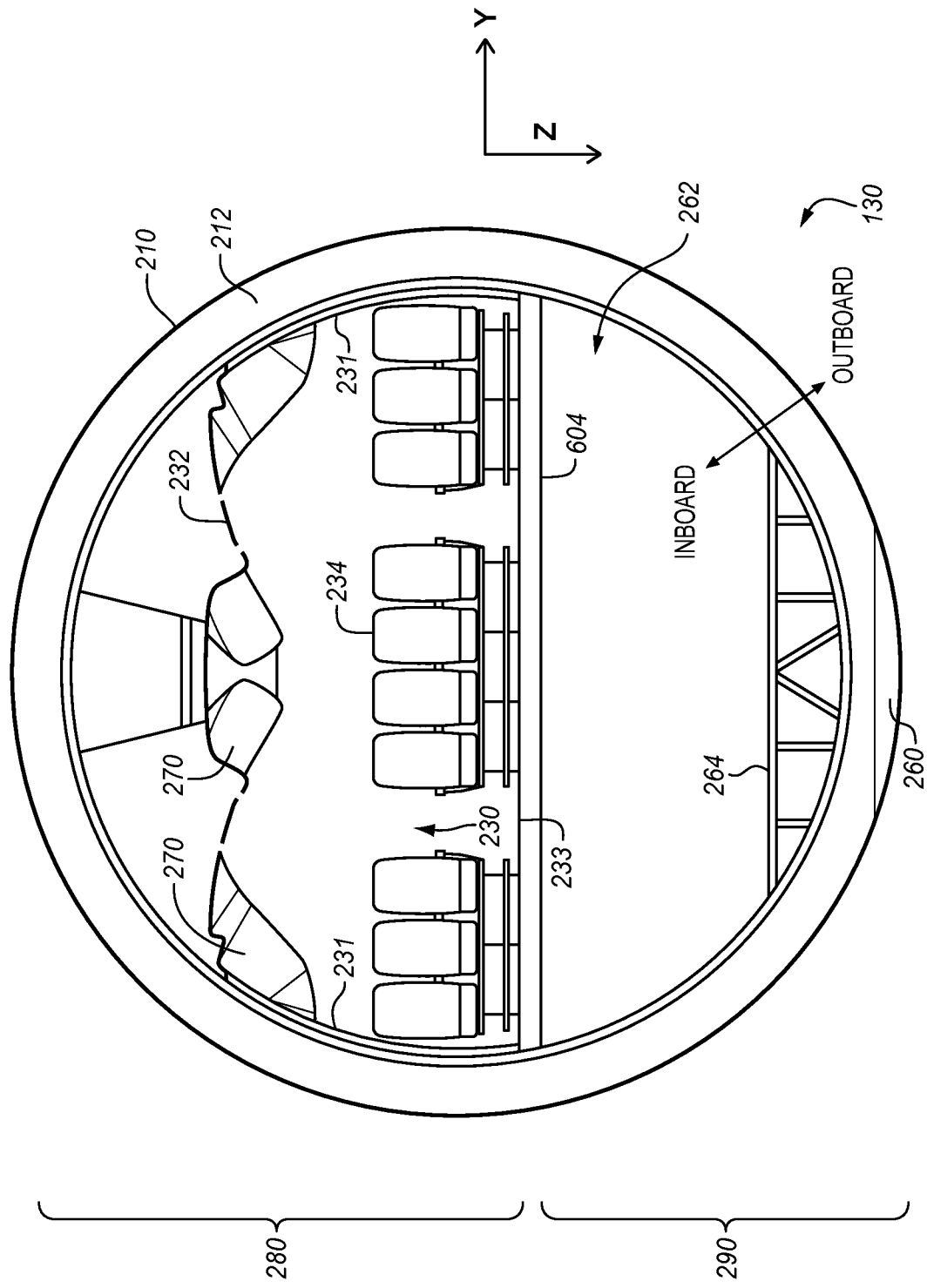
FIG. 2 is a front cut-through diagram of a portion of aircraft fuselage in an exemplary embodiment.

FIGS. 1-2 illustrate the structure of an exemplary aircraft. Specifically, FIG. 1 is a diagram of an aircraft 100 in an exemplary embodiment. Aircraft 100 includes nose 110, wings 120, fuselage 130, and tail 140. FIG. 1 also illustrates a downward direction (Z) for aircraft 100. FIG. 2 is a cut-through front view of aircraft 100 indicated by view arrows 2 in FIG. 1. FIG. 2 illustrates a cross sectional view of aircraft fuselage 130. Fuselage 130 includes upper section 280, which includes floor 233 (supported by one or more joists 604), ceiling 232, and sidewalls 231 forming cabin 230. Support members 212 (e.g., comprising hoopwise frames and longitudinally elongated stringers) enforce the shape of fuselage 130 and provide structural support. In this embodiment, seating 234 and storage 270 are also included. Fuselage 130 also includes lower section 290, which includes drainage 260, located beneath cargo floor 264 of cargo area 262. FIG. 2 further illustrates that an outboard direction proceeds towards an external surface (e.g., skin 210) of aircraft 100, and an inboard direction proceeds towards the interior (e.g., cabin 230) of aircraft 100. As shown in FIG. 2, skin 210 surrounds fuselage 130.

Figure 3:
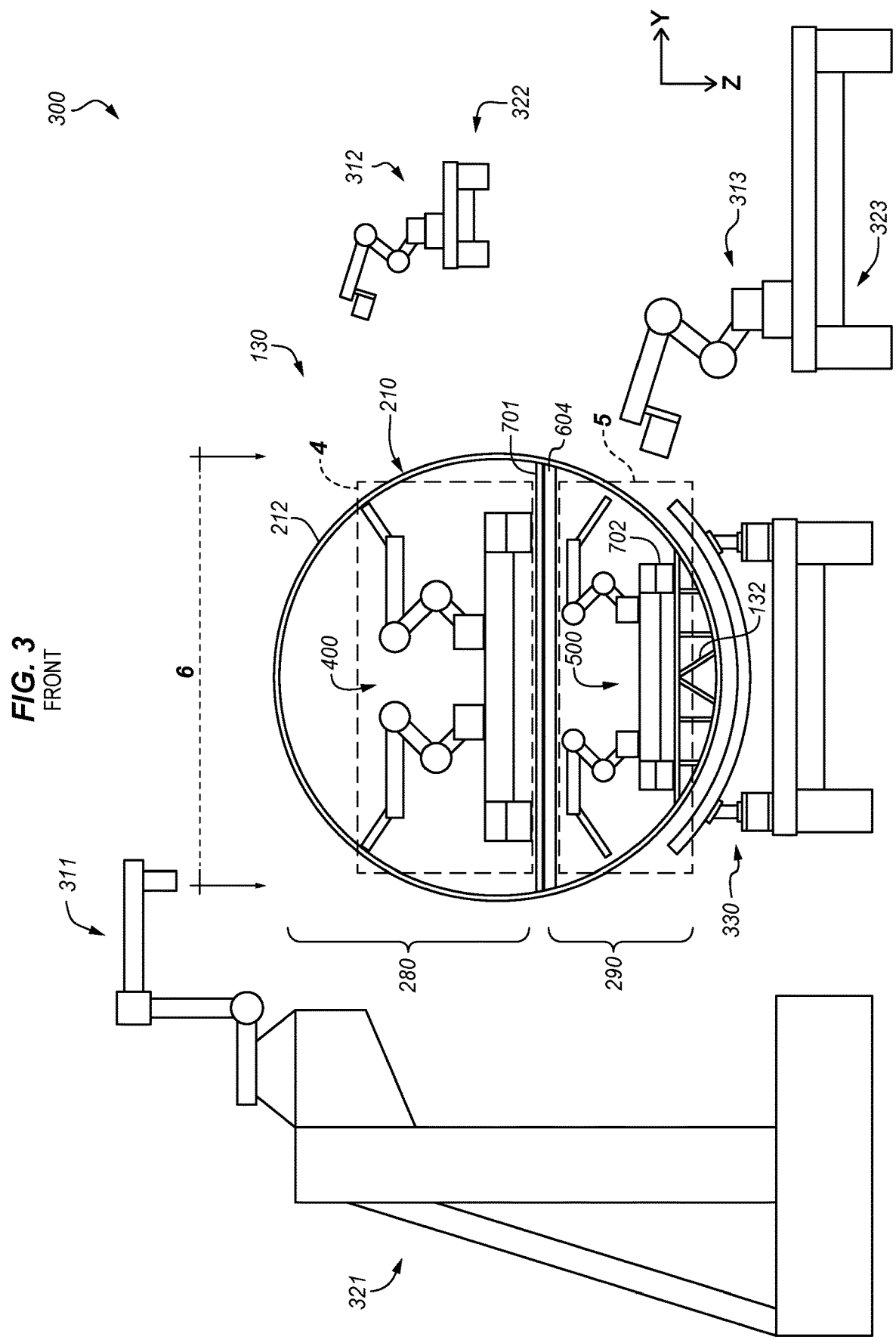
FIG. 3 is a front view of a manufacturing environment for a portion of aircraft fuselage in an exemplary embodiment.

FIG. 3 is a front view of a manufacturing environment 300 for a portion of aircraft fuselage 130 in an exemplary embodiment. That is, FIG. 3 illustrates the same view of fuselage 130 as FIG. 2, but represents the environment in which fuselage 130 is manufactured/fabricated. Hence, differences found in fuselage 130 between FIG. 2 and FIG. 3 are the result of the fabrication of fuselage 130 being completed in FIG. 2, and yet still in progress in FIG. 3.

Manufacturing environment 300 comprises any system operable to utilize automated processing by robots to assemble structural components 212 of fuselage 130 and skin 210 together in order to form an airframe for aircraft 100. In this embodiment, manufacturing environment 300 includes fuselage 130, which is mounted onto cradle 330. Manufacturing environment 300 further includes external robots 311, 312, and 313, which are mounted on supports 321, 322, and 323, respectively. Supports 321, 322, and 323 are mounted onto Automated Guided Vehicles (AGVs), and hence may traverse fuselage 130 as desired in order to perform work on fuselage 130. External robots 311-313 coordinate their actions with mobile tracked robot assemblies 400 and 500 within fuselage 130, in order to engage in fastening operations that assemble fuselage 130 and/or affix skin 210 to support members 212 of fuselage assembly 130. As used herein, an assembly is "tracked" when it includes tracks/treads via which it may traverse an environment. That is, instead of moving along tracks that are independent components which are already laid-out to define a path (e.g., akin to train tracks), the assemblies described herein include their own treads/tracks (e.g., akin to tank treads/tracks). Assembly 400 performs work within upper section 280 of fuselage 130, while assembly 500 performs work within lower portion 290 of fuselage 130. Furthermore, assembly 400 moves across a temporary floor 701 in upper section 280, which is mounted to joists 604. Assembly 500 moves across temporary floor 70 in lower section 290, which is mounted to structure 132.

Figure 4:
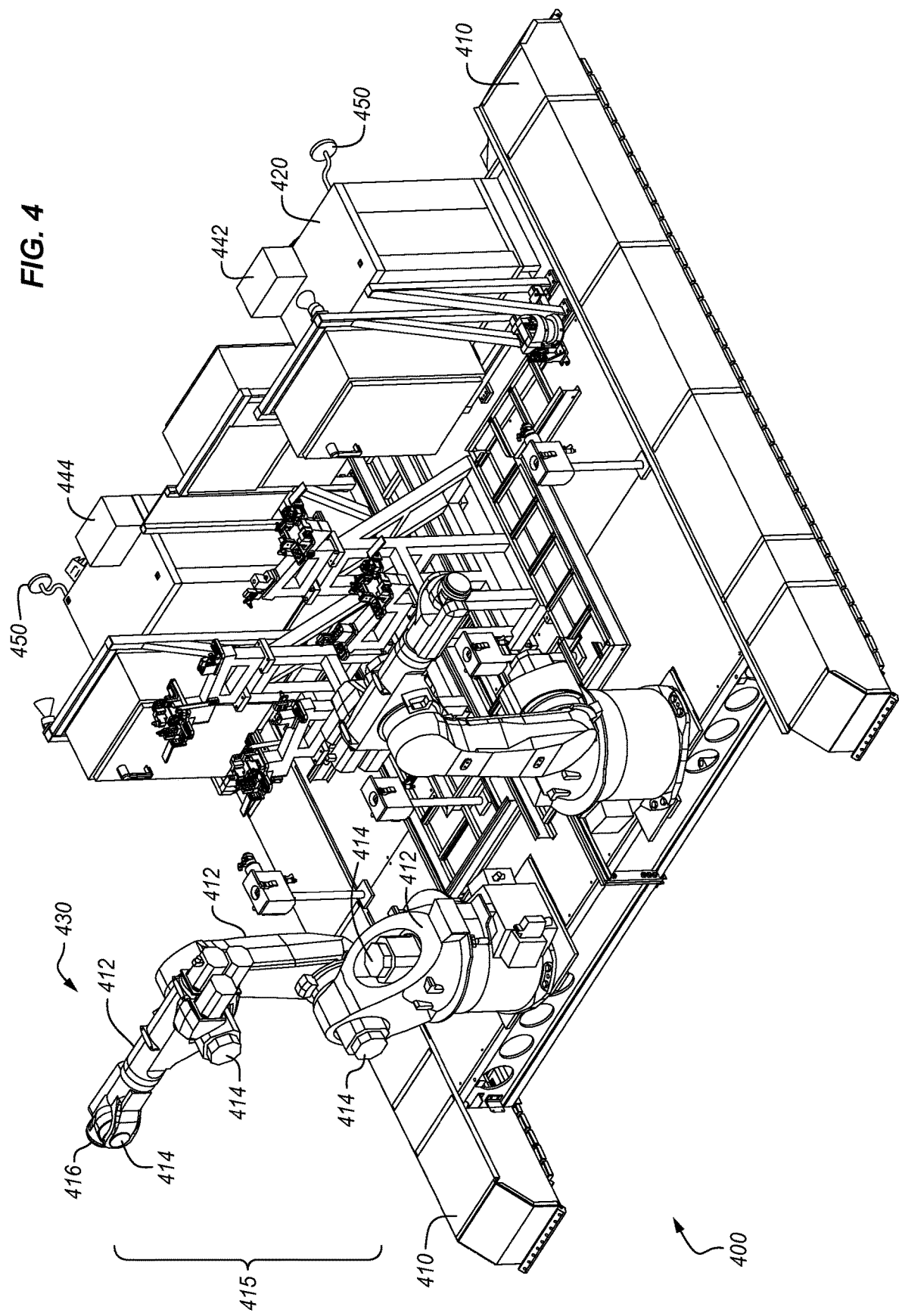
FIG. 4 is a perspective view of a tracked robot assembly for an upper section of fuselage in an exemplary embodiment.
Figure 5:
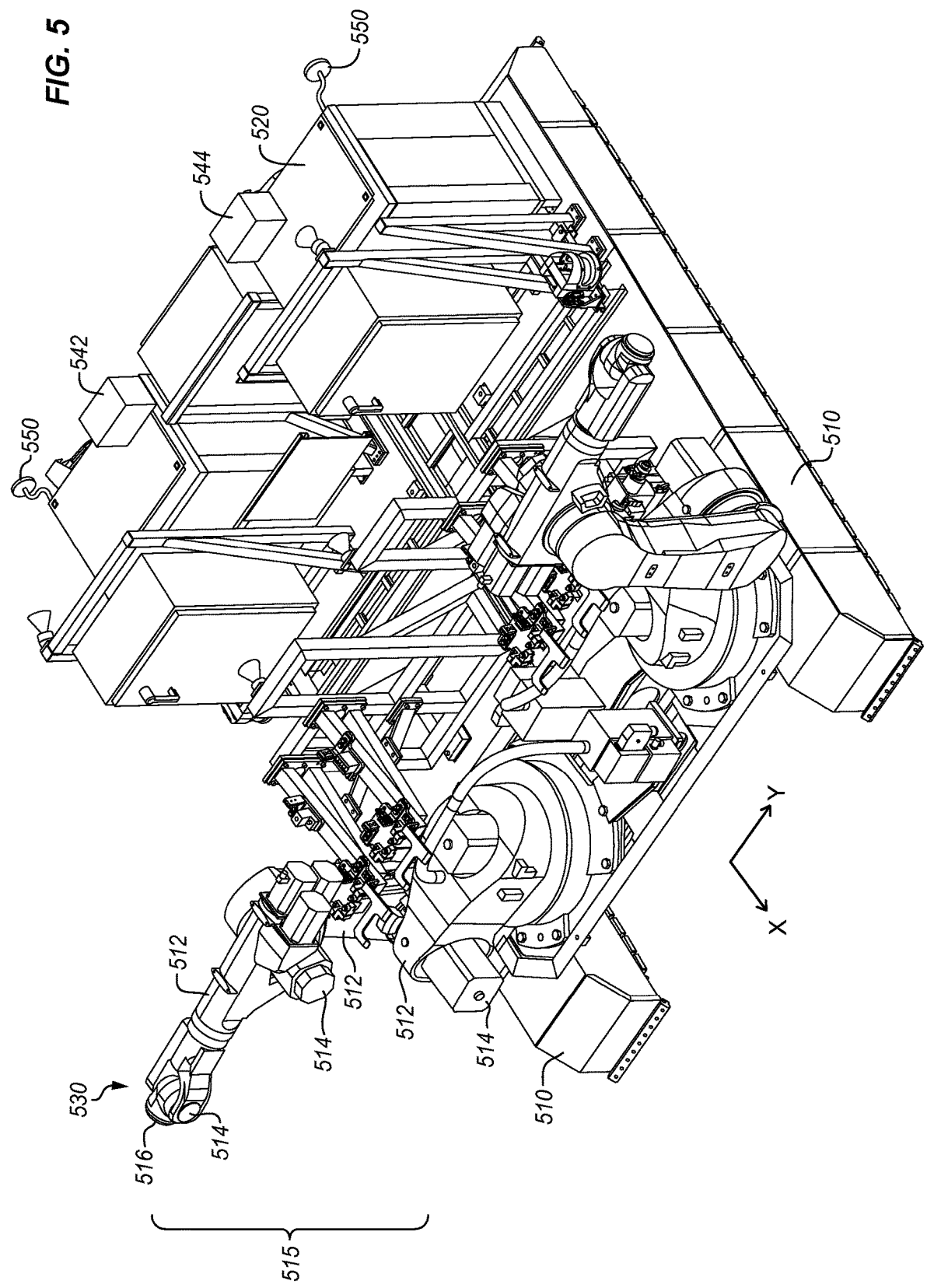
FIG. 5 is a perspective view of a tracked robot assembly for a lower section of fuselage in an exemplary embodiment.

Further details of assembly assemblies 400-500 will be described with regard to FIGS. 4-5. For example, FIG. 4 is a perspective view of region 4 of FIG. 3, and illustrates that assembly 400 includes tracks 410, and robot arms 430. Robot arms 430 each are defined by a kinematic chain 415 that includes rigid bodies 412 and actuators 414, and are terminated by end effectors 416. End effectors 416 perform work upon fuselage 130 in order to assemble fuselage 130 (e.g., by fastening skin 210 to fuselage 130, drilling holes in fuselage 130, etc.). The operations of robot arms 430 are managed by instructions in an NC program kept at controller 420. Controller 420 may be implemented, for example, as custom circuitry, as a processor executing programmed instructions, or some combination thereof.

Assembly 400 also includes ranging sensors 442 and 444. In one embodiment, sensors 442 and 444 are laser ranging sensors (e.g., Light Detection and Ranging (LIDAR) sensors) that measure distances to retroreflective targets. In further embodiments, however, sensors 442 and 444 may be implemented as ultrasonic ranging sensors, or other sensors capable of measuring distance to a known target. Since sensors 442 and 444 are located at similar fore/aft positions on assembly 400, but different lateral positions, a change in direction of assembly 400 may be detected by identifying a difference between distances measured by sensors 442 and 444. Assembly 400 also includes targets 450. Targets 450 may be utilized by external ranging sensors to detect an exact position of assembly 400 after assembly 400 has completed moving in accordance with an NC program. FIG. 5 illustrates a perspective view of region 5 of FIG. 3. FIG. 5 specifically illustrates assembly 500, which in a similar fashion to assembly 400 of FIG. 4 includes tracks 510, controller 520, and robot arms 530 comprising kinematic chains 515 defined by rigid bodies 512, actuators 514, and end effectors 516. Assembly 500 further includes ranging sensors 542 and 544, and targets 550. With assemblies 400-500 being fully described above, details of the operations of assemblies 400-500 within fuselage 130 will now be described with regard to FIGS. 6-8.

Figure 6:
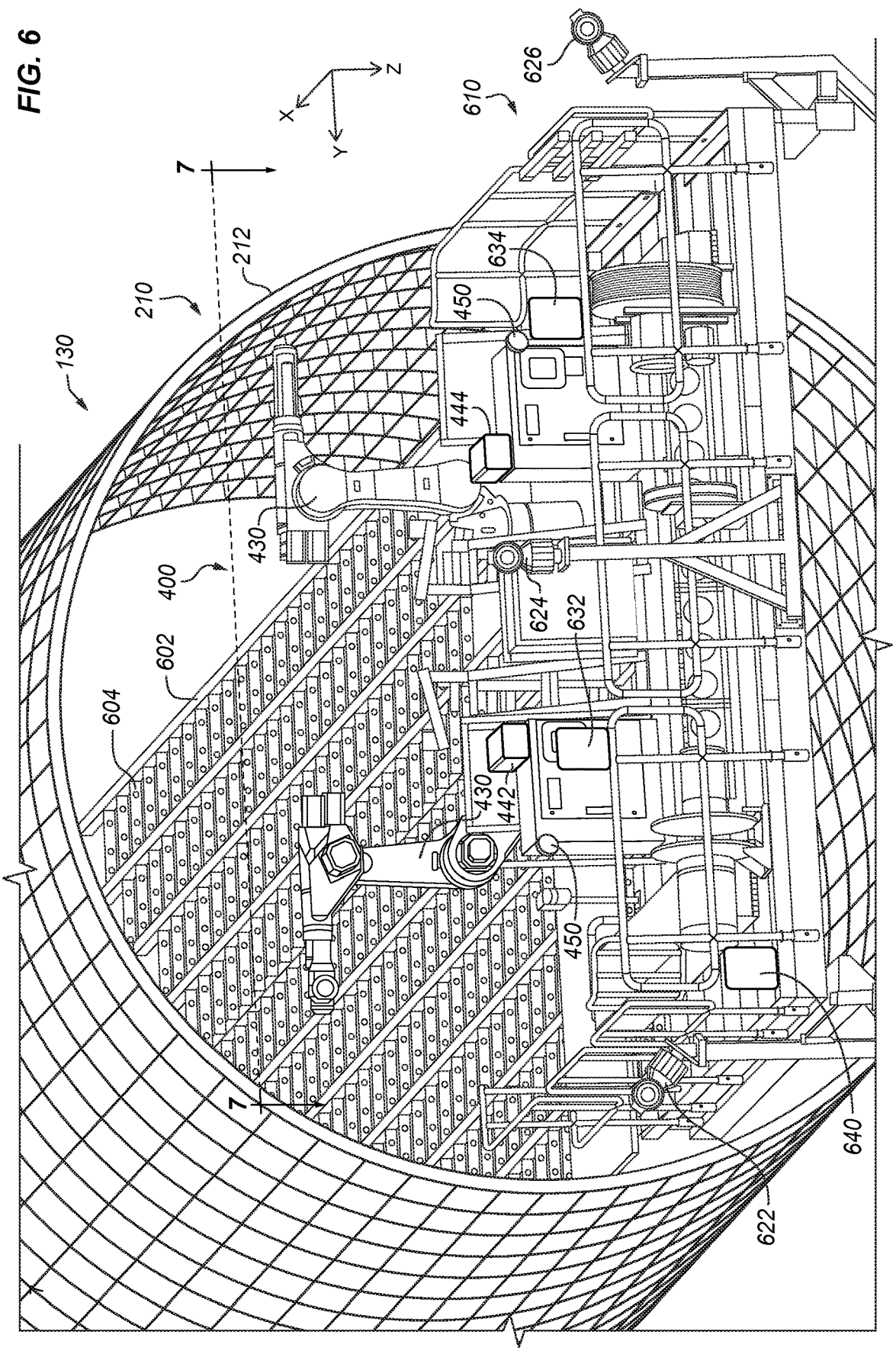
FIG. 6 is a perspective view of a workstand holding a tracked robot assembly in an exemplary embodiment.

FIG. 6 is a perspective view of a workstand 610 holding a tracked robot assembly 400 in an exemplary embodiment. According to FIG. 6, assembly 400 is oriented on workstand 610 just prior to entering fuselage 130. Workstand 610 may be used, for example, to load assembly 400 into upper section 280 of fuselage 130, or to load assembly 500 into lower section 290 of fuselage 130. After assembly 400 has finished moving from workstand 610 into fuselage 130, its position may be identified by sensor 624. Controller 640 manages the operations of sensors 622-626. In a similar fashion, while assembly 400 is in motion, controller 420 may utilize sensors 442 and 442 to track distances to targets 632 and 634. Beams 602 and joists 604 provide a framework into which a temporary floor may be added, although a temporary floor is not shown FIG. 6.

Figure 7:
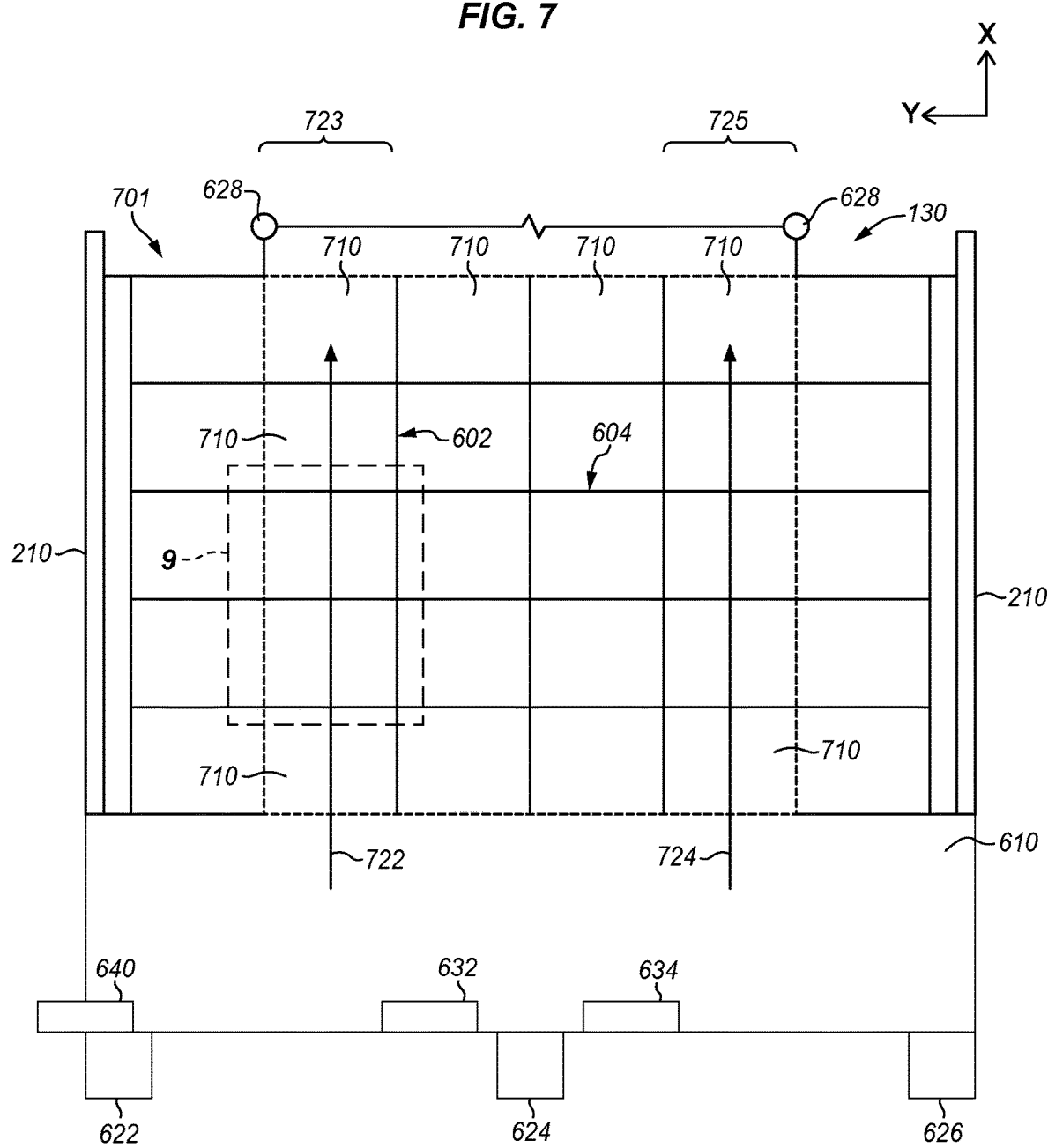
FIG. 7 is a section cut view of a workstand for loading a tracked robot assembly into a fuselage in an exemplary embodiment.

FIG. 7 is a section cut view of a workstand 610 for loading a tracked robot assembly 400 (also referred to simply as "assembly 400") into fuselage 130 in an exemplary embodiment. Assembly 400 is not shown in this figure in order to reduce clutter, while temporary floor 701 is shown. Assembly 400 will move along track paths 722 and 724 across temporary floor 701. Although track paths 722 and 724 are shown as linear in FIG. 7, track paths 722 and 724 may vary in further scenarios where an assembly changes its position on the Y axis to align with desired locations for performing work via its end effectors. As shown in FIG. 7, temporary floor 701 includes multiple temporary floor boards 710. Temporary floor 701 covers joists 604 and beams 602 to provide a smooth structure over which a tracked robot assembly may traverse. Each temporary floor board 710 is fitted/dimensioned to hang from between joists 604 (which each extend laterally across fuselage 130 in the Y direction) and beams 602 (which each extend longitudinally across fuselage 130 in the X direction) while also covering joists 604 and beams 602. Furthermore, each track path corresponds with/intersects a set of floor boards 710. Thus, as shown in FIG. 7, track path 722 corresponds with set 723 of floor boards 710 on a left side of fuselage 130, while track path 724 corresponds with set 725 of floor boards 710 on a right side of fuselage 130.

Since floor boards 710 hang freely between/atop beams 602 and joists 604, and are not fixedly attached to beams 602 and joists 604 (e.g., in order to ensure that temporary floor 701 may be easily installed by "dropping in" and can removed without wasting a substantial amount of labor), floor boards 710 are capable of sliding back and forth in the X and/or Y directions. This presents a problem in that it makes the motions of assemblies traveling within fuselage 130 harder to track by dead reckoning (e.g., by noting the number of revolutions performed by each track of the assembly). To address this issue, workstand 610 includes multiple features for ensuring proper positioning and repositioning of an assembly traveling within fuselage 130. The first set of features includes sensors 622, 624, and 626. Sensor 624 is utilized to track targets (e.g., targets 450) on assembly 400 after the assembly has completed movement, in order to determine whether assembly 400 has reached an intended destination. Furthermore, sensors 622-626 are used to analyze targets 628 on fuselage 130. Since sensors 622-626 occupy known locations with respect to each other, their input may be combined in order to determine where the assembly is located within a coordinate space of fuselage 130. Such analysis (e.g., performed by sensor 624 tracking a target 450 during motion) may help to facilitate collision avoidance while assembly 400 operates within fuselage 130. A controller 640 may be utilized at workstand 610 (or at another location) in order to perform various calculations related to sensors 622-626. The second set of features includes targets 632 and 634 (e.g., retroreflective targets, ultrasound targets, etc.). These targets 632 and 634 may be utilized together with ranging sensors on the assembly in order to provide the assembly with input indicating whether the assembly is remaining true to its intended orientation.

Figure 8:
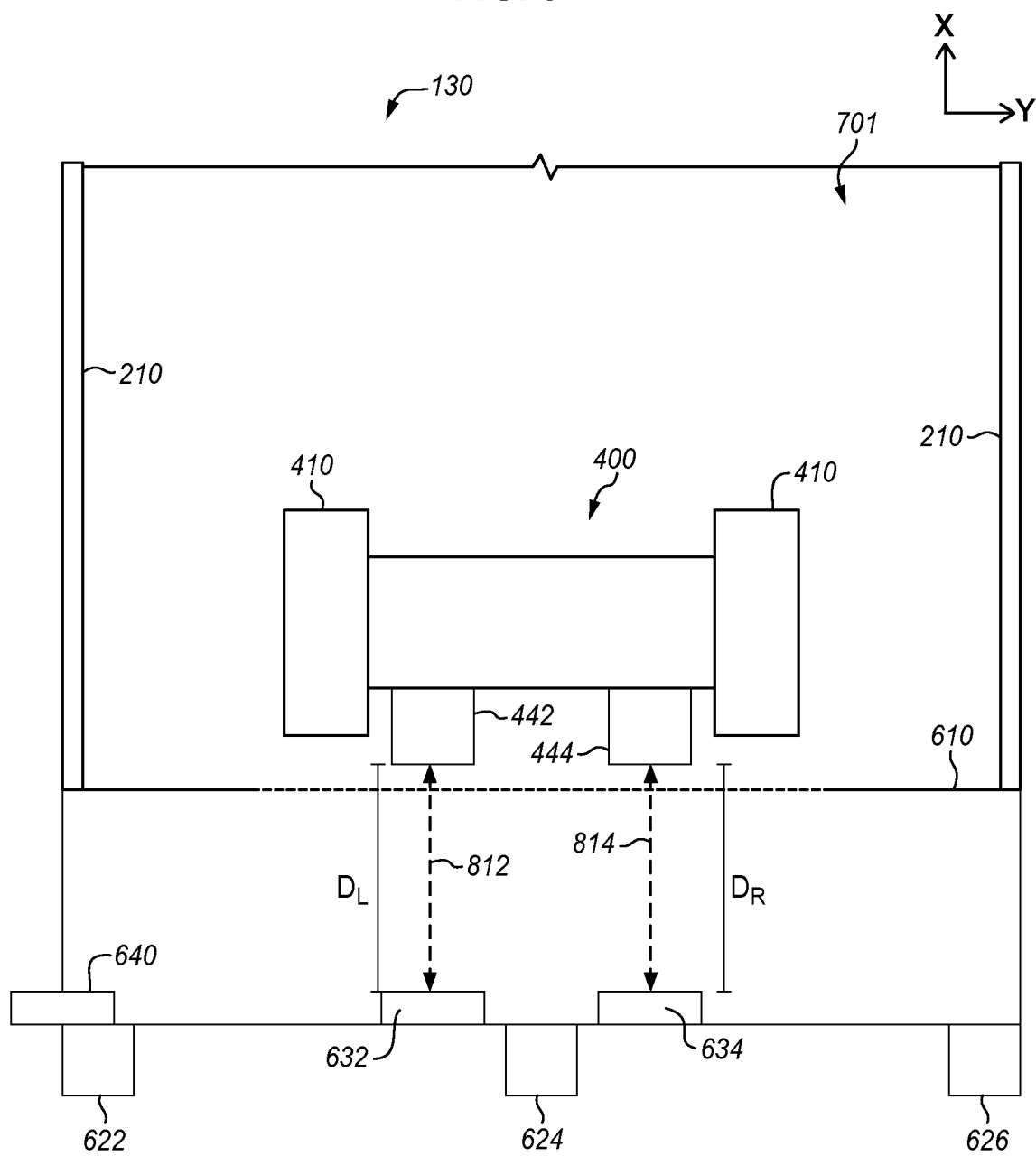
FIG. 8 is a top view of a tracked robot assembly utilizing ranging sensors within a fuselage of an aircraft in an exemplary embodiment.

Meanwhile, FIG. 8 is a block diagram that illustrates the same view as shown in FIG. 7, except that the temporary floor 700 has been omitted for clarity, while assembly 400 has been added. In this embodiment, ranging sensors 442 and 444 continuously operate to acquire ranging data as assembly 400 moves forward. Sensors 442 and 444 perform this goal by transmitting beams of light and/or waves of sound (812, 814) towards targets 632 and 634, and acquiring distance data via reflections of these light beams and/or sound waves. The distance data includes distance measurement $D_L$ indicating a distance between left ranging sensor 442 and left target 632, as well as distance measurement $D_R$ indicating a distance between right ranging sensor 444 and right target 634. If assembly 400 changes its angle of orientation during movement (causing drifting or drifts from side to side), the values of $D_L$ and $D_R$ will change with respect to each other. These differences between $D_L$ and $D_R$ may be analyzed by assembly 400 during its travels (i.e., while in motion) in order to detect deviations from an intended angle for assembly 400, and to correct for those deviations (e.g., for example by driving one track 410 for a longer period/larger number of revolutions/different distance than another track 410 of assembly 400). In a further embodiment, deviations are corrected for by moving forward in a turning pattern and backward in a different turning pattern. In this manner, controller 420 iteratively and continuously determines the left distance, determines the right distance, detects a difference in determined distances, and adjusts the orientation of the assembly as the assembly continues towards the location.

Figure 9:
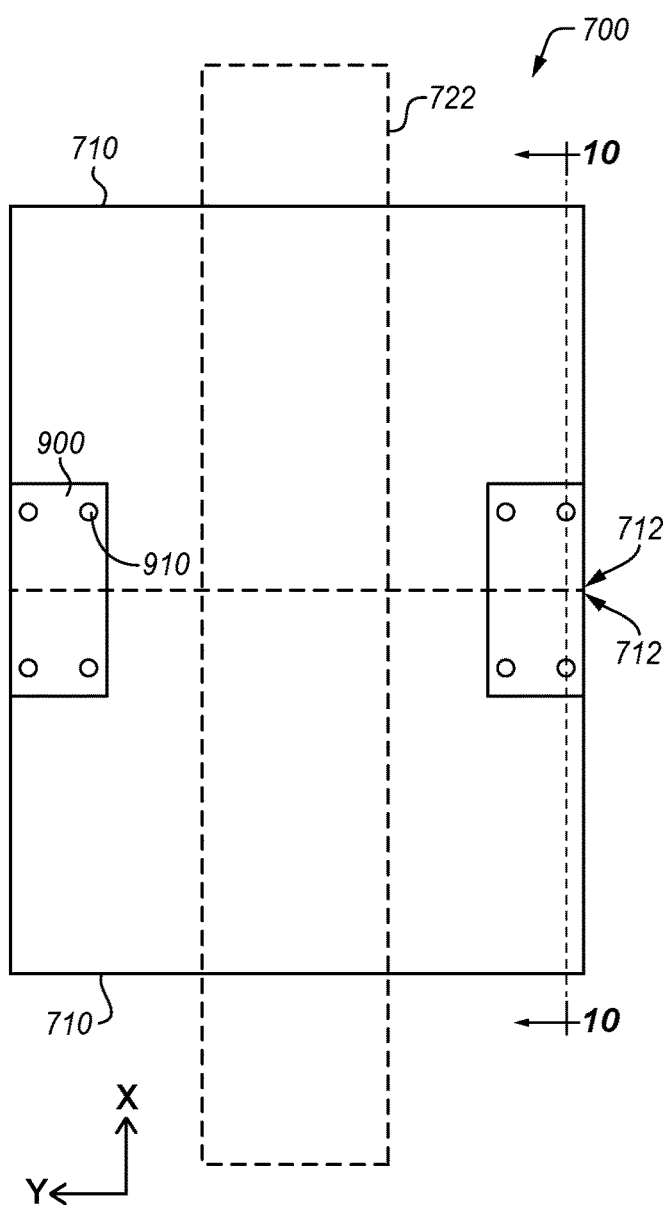
FIG. 9 is a top view of temporary floor boards held to each other by mechanical interlock mechanisms in an exemplary embodiment.
Figure 10:
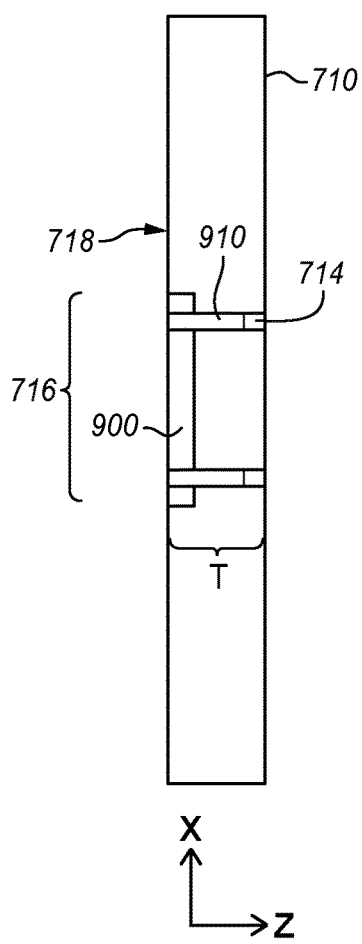
FIG. 10 is a side view of temporary floor boards held to each other by mechanical interlock mechanisms in an exemplary embodiment.

In addition to the above-described techniques and systems for accounting for deviations from an expected path of an assembly 400, FIGS. 9-10 illustrate exemplary mechanical interlock mechanisms 900 that may be utilized within a track path of an assembly in order to ensure that floor boards do not slip with respect to each other while the assembly is moving over a temporary floor 701. In FIG. 9, two floor boards 710 are located along track path 722. These floor boards 710 are mounted together via interlock mechanisms 900, which are located at/proximate to corners 712 of floor boards 710. In a further embodiment, each interlock mechanism 900 occupies the space created by four neighboring corners of four separate floorboards 710. As shown in FIG. 10, each interlock mechanism 900 is located within a recess 716 of a floor board 710, in order to ensure that interlock mechanism is flush with surface 718 of floor board 710 when mounted. Furthermore, floor boards 710 include receptacles/ holes 714 (of thickness/depth T) into which pins 910 of interlock mechanism may be mounted (e.g., dropped in, slid, or press fit to enable quick and tool-less installation of the temporary floor). Pins 910 enforce structural rigidity by structurally uniting various floor boards 710 within fuselage 130. Installing the mechanical interlock mechanisms 900 causes the floor boards 710 to resist longitudinal forces and/or bending.

Illustrative details of the preparation of a temporary floor at fuselage 130 will be discussed with regard to FIG. 11. Assume, for this embodiment, that support members 212 of fuselage 130 have been assembled into a support structure ("skeleton") of an airframe, but no portions of skin 210 have yet been fastened. In order to enable fastening operations to begin, it is therefore desirable to install a temporary floor 701 in upper section 280 and a temporary floor 702 in lower section 290 of fuselage 130. This ensures that assemblies 400 and 500 may traverse fuselage 130 in order to perform fastening operations.

Figure 11:
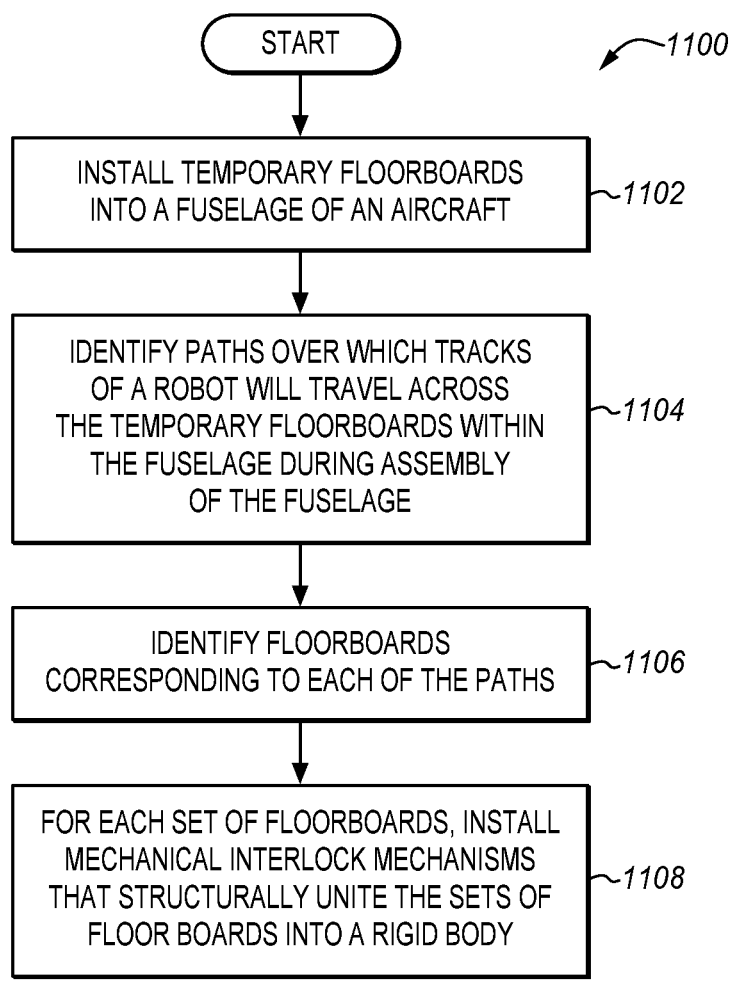
FIG. 11 is a flowchart illustrating a method of interlocking temporary floor boards in an exemplary embodiment.

FIG. 11 is a flowchart illustrating a method 1100 for installing a temporary floor comprising interlocked floor boards in an exemplary embodiment. The steps of method 1100 are described with reference to fuselage 130 of FIG. 1, but those skilled in the art will appreciate that method 1100 may be performed in other mechanical environments. The steps of the flowcharts described herein are not all inclusive and may include other steps not shown. The steps described herein may also be performed in an alternative order.

Temporary floor boards 710 are installed into fuselage 130 (e.g., by placing/hanging individual floor boards 710 between joists 604 and beams 602, without fastening floor boards 710 to joists 604 or beams 602). Since floor boards 710 are temporary (e.g., are only held in place by their weight, and are not fastened to joists 604 or beams 602), they are subject to sliding within fuselage 130 by incremental amounts in the X and/or Y direction when traveled upon by an assembly (e.g., a machine weighing multiple tons). This means that floor boards 710 are likely to interfere with the ability of an assembly to determine its travel (distance and trajectory) by dead reckoning. To account for this issue, track paths are identified for the assembly (e.g., 400, 500) over which the assembly will travel across the temporary floor boards within fuselage 130 during assembly of fuselage 130 (step 1104). This may be performed, for example, by controller 640 or controller 520 analyzing an NC program dictating the operations of the assembly.

With the track paths known, floor boards 710 are identified which correspond to each of the track paths (step 1106). This may be performed by determining which floor boards 710 will be underneath tracks (e.g., 410, 510) while the assembly is operating in accordance with the NC program. Then for each set of floor boards corresponding to a different track path, mechanical interlock mechanisms 900 are installed in order to unite that set into a rigid body (step 1108). This reduces the amount of translation error caused by slippage of floor boards 710 when an assembly moves across temporary floor 701.

Figure 12:
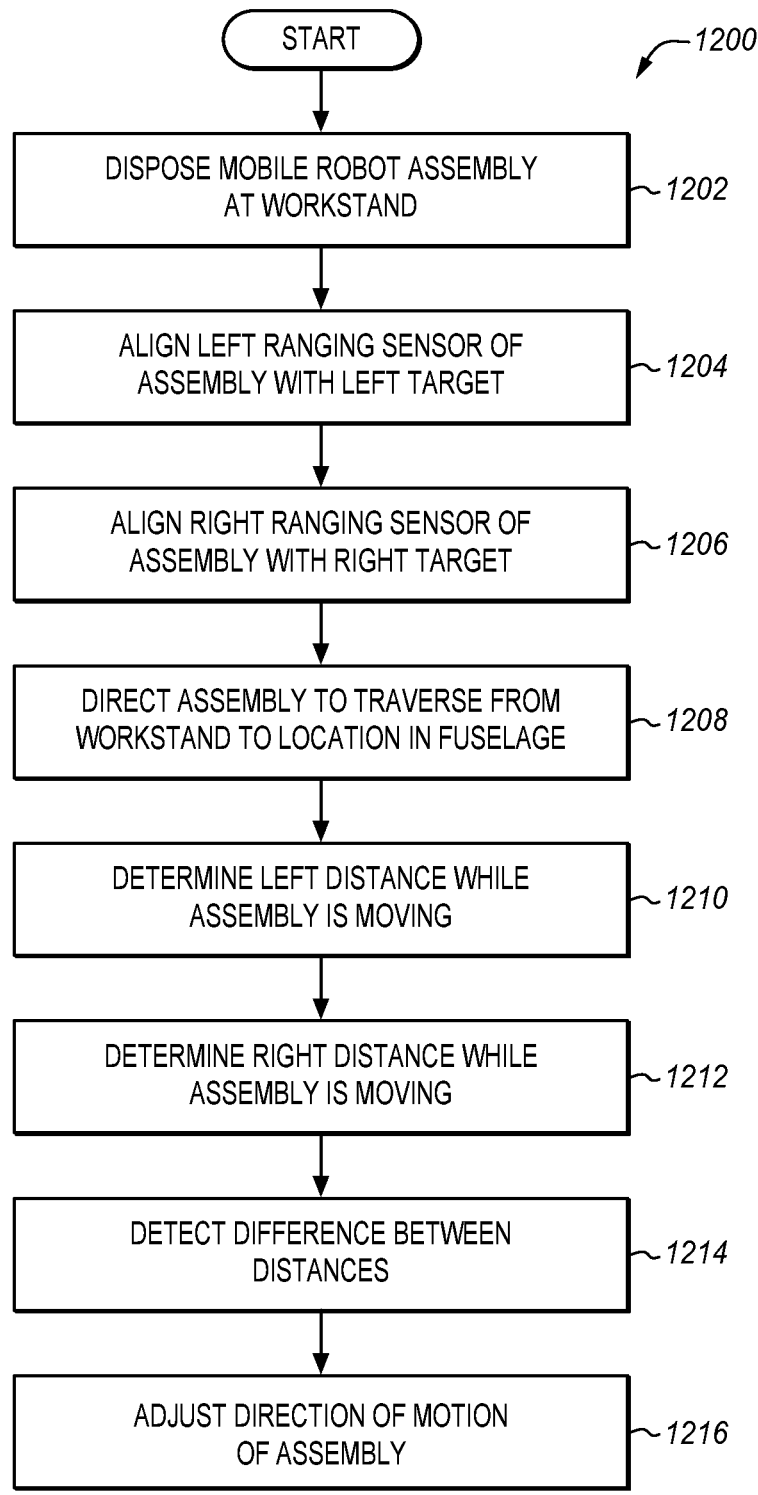
FIGS. 12-13 are flowcharts illustrating a method for operating a tracked robot assembly in an exemplary embodiment.

Illustrative details of the operation of assemblies (e.g., 400, 500) within manufacturing environment 300 will be discussed with regard to FIG. 12. Assembly 400 is first disposed at workstand 610 (step 1202). With assembly 400 located on workstand 610, left ranging sensor 442 is aligned with left target 632 of workstand 610 (step 1204), and right ranging sensor 444 is aligned with right target 632 of workstand 610 (step 1206). Aligning sensors 442-444 with targets 632-634 comprises ensuring that laser beams (or ultrasonic waves) emitted by sensors 442-444 hit targets 632-634 when emitted by sensors 442-444.

After the sensors have been aligned, controller 640 may utilize metrology via target 628 to determine the coordinate space of fuselage 130, and may further utilize metrology upon targets 450 to determine the location of workstand 610 and assembly 400 within fuselage 130. Based on this information, controller 640 determines how to move assembly 400 to a desired location within fuselage 130 in order to perform work upon fuselage 130 (e.g., by performing one or more fastening operations). Thus, controller 640 sends instructions to controller 420 of assembly 400 in order to direct assembly 400 to traverse from workstand 610 to the desired location in fuselage 130 (step 1208). Controller 420 directs tracks 410 to move assembly 400 forward as indicated by the instructions. As a part of this process, while assembly 400 is moving, controller 420 operates left sensor 442 to determine a distance to left target 632 (step 1210), and further operates right sensor 444 to determine a distance to right target 634 (step 1212).

By detecting a difference between the measured distances (step 1214), controller 420 may determine whether assembly 400 has changed direction while moving forward (e.g., because a floor board 710 has slipped underneath a track 410). For example, if sensors 442-444 are initially aligned such that they are equidistant from their respective targets, then if a left distance measured by sensor 442 becomes less than a right distance measured by sensor 444, this is indicative of assembly 400 turning left. Alternatively, if sensors 442 and 444 are not initially aligned at the same distance from their respective targets, then an initial distance from each sensor to its corresponding target may be determined. The initial difference between the left distance and right distance is indicative of a straight orientation (e.g. a directly forward orientation) for assembly 400. If the difference changes, controller 420 may detect a change in the orientation of assembly 400 during movement, even without knowing the exact position of the assembly in the coordinate space of fuselage 130. This enables controller 420 to engage in closed loop control of assembly 400 to ensure that assembly 400 is following the desired trajectory. Thus, if the difference between the left and right distances remains the same/constant, this implies that assembly 400 is traversing fore/aft along the X axis. For example, if assembly 400 is pointing true in the X axis direction and on the centerline of the intended traversal path, then if the difference between the left and right distance measures from the left and right sensors remains constant then assembly 400 is ensured to be traversing along a desired straight line path along the X axis and centered on the centerline of the traversal path. In short, controller 420 may adjust a direction of motion of assembly 400 (i.e., a direction of assembly 400 corresponding to the direction in which tracks 410 are pointing) (step 1216).

In further embodiments, one or more sensors on workstand 610 (e.g., sensor 624) may track one or more targets 450 at assembly 400 while assembly 400 is in motion. This tracking may be utilized by controller 640 to determine a general location of assembly 400 within fuselage 130, in order for controller 640 to determine whether assembly 400 is about to collide with fuselage 130. In such instances, controller 640 may instruct assembly 400 to halt before colliding with fuselage 130.

EXAMPLES

In the following examples, additional processes, systems, and methods are described in the context of a system that directs the operations of a mobile tracked robot assembly performing fastening operations that assemble a fuselage of an aircraft.

Figure 13:
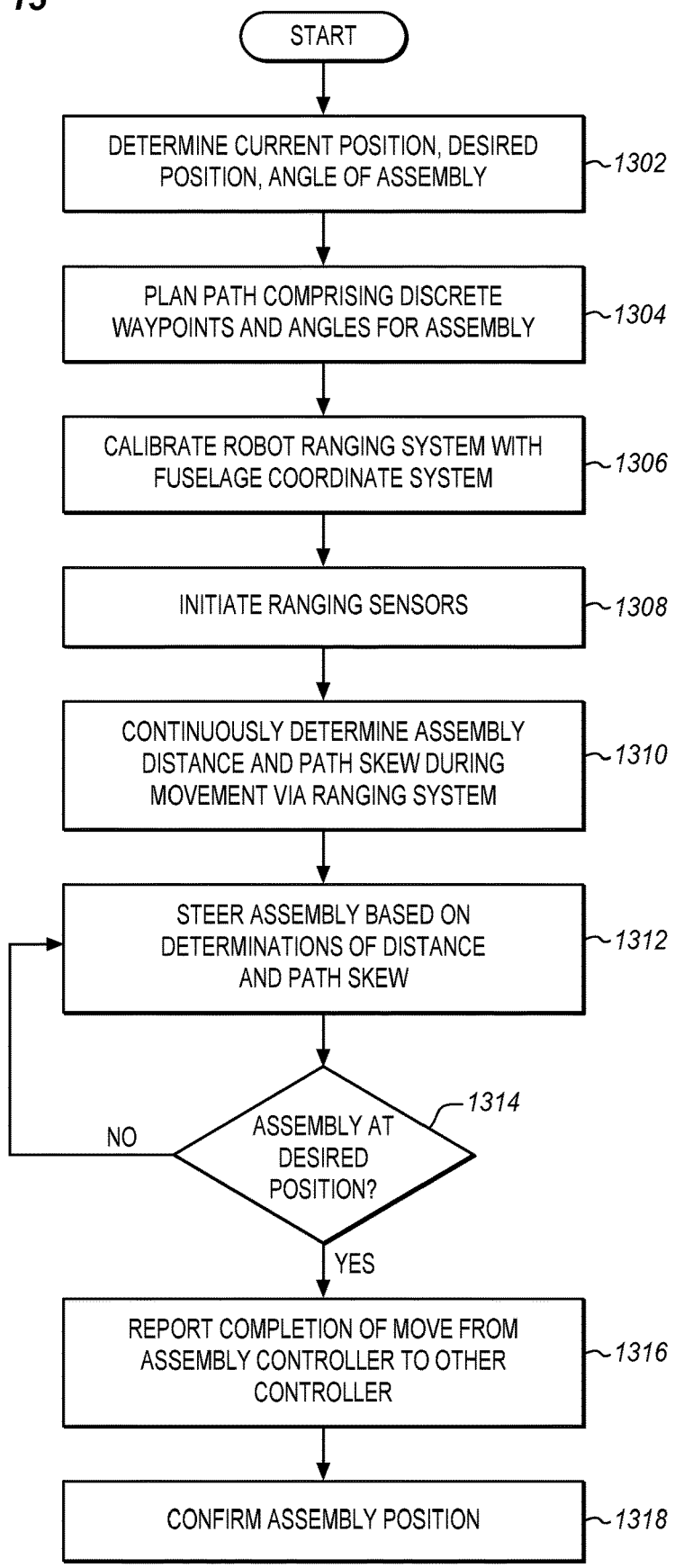

FIG. 13 illustrates a detailed method for coordinating the movement of an assembly (e.g., assembly 400, assembly 500) within a fuselage in an exemplary embodiment. According to method 1300, controller 640 initiates by determining the current position and orientation/angle of assembly 400 (with respect to workstand 610) by using metrology to analyze targets 450 placed on assembly 400. Controller 640 further determines a desired position of assembly 400 within fuselage 130 (e.g., by performing metrology upon targets 628, and identifying a location of assembly 400 within the coordinate system of fuselage 130) (step 1302). Having identified the current position and desired position of assembly 400, controller 640 proceeds to plan a path for assembly 400 within fuselage 130, which will take assembly 400 to various positions at which fastening operations will be performed to fasten skin 210 to support members 212 (step 1304). Controller 640 then calibrates ranging sensors for assembly 400 (e.g., comprising sensors 442-444 and targets 632-634), for example by measuring a left distance and a right distance. This process may involve transforming locations from a coordinate space of assembly 400 to a coordinate space of fuselage 130. Controller 640 then directs controller 420 to activate the ranging sensors (step 1308), and proceeds to move assembly 400 in accordance with the determined path, stopping at each defined location on the path in order to perform fastening operations.

As a part of moving assembly 400, controller 420 continuously utilizes the ranging sensors 442-444 to determine a distance from assembly 400 to workstand 610, as well as path skew (e.g., changes in orientation and/or position of assembly 400 from the defined path) (step 1310). Controller 420 may therefore determine that the right distance is less than the left distance, and identify a rightward angular deviation of the assembly based on the difference, or may determine that the left distance is less than the right distance, and identify a leftward angular deviation of the assembly based on the difference. Controller 420 continues onward to steer assembly 400 based on the determinations of distance and path skew (step 1312). For example, if assembly 400 is deviating leftward, controller may steer assembly 400 rightward to correct for the error, by instructing the assembly to turn left based on the angular deviation. Similarly, if assembly 400 is deviating rightward, controller may steer assembly 400 leftward to correct for the error, by instructing the assembly to turn left based on the angular deviation. If assembly 400 has arrived at its desired position (step 1314), then processing continues to step 1316. Otherwise, controller 420 re-steers/moves assembly 400 as per step 1312. In short, controller 420 detects a difference between the distances measured by sensors 442-444 while assembly 400 is moving, and reorients assembly 400 based on the difference in order to drive assembly 400 to a new position within fuselage 130.

If assembly 400 has arrived at the desired position, controller 420 reports completion of the successful movement to controller 640 (step 1316). Controller 640 may then operate sensors 624 at workstand 610 to confirm that assembly 400 has arrived at the desired position (step 1318). If assembly 400 has successfully arrived at its desired position, assembly 400 may be utilized to perform fastening operations at that location.

Alternatively, if assembly 400 has not arrived at its desired position, controller 640 may determine that assembly 400 has stopped moving, utilize a ranging sensor 624 to identify multiple targets 450 on the assembly, utilize ranging sensors 622-626 to identify multiple targets 628 on the fuselage 130, comparing the targets 450 on the assembly with the targets 628 on the fuselage 130 to determine a proximity of assembly 400 to the desired location, and instruct assembly 400 to reposition based on the proximity.

Instructing the assembly to change position may comprise directing assembly 400 to back up, adjust angle while backed up, and move towards the location again in order to adjust a lateral position of assembly 400 (i.e., a position of assembly 400 along the Y axis). Alternatively, instructing assembly 400 to reposition comprises directing assembly 400 to back up or move forward to adjust a longitudinal position of assembly 400 (i.e., a position of assembly 400 along the X axis).

Figure 14:
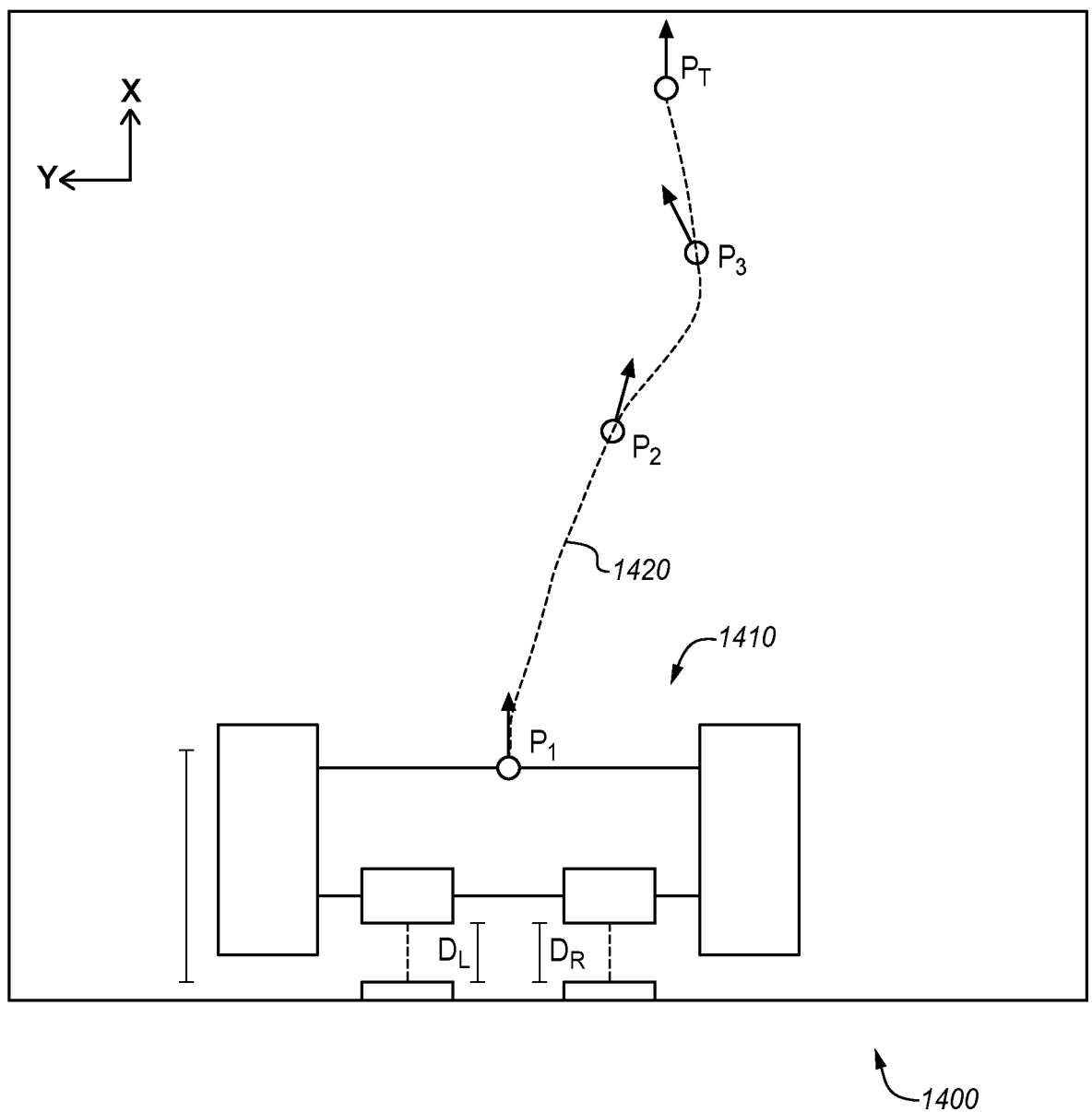
FIG. 14 is a block diagram illustrating a top view of motion of a tracked robot assembly within a fuselage in an exemplary embodiment.

FIG. 14 is a block diagram 1400 illustrating a top view of motion of a tracked robot assembly 1410 within a fuselage in an exemplary embodiment. As assembly 1410 continues forward as indicated by dashed line 1420, and angle of orientation from an initial point ($P_1$) to $P_2$, $P_3$, and a final point ($P_T$) varies. Using the techniques described with regard to FIGS. 12-13, deviations in angle of assembly 1410 may be beneficially corrected based on $D_L$ and $D_R$ to account for any errors in motion caused by sliding floor boards located underneath assembly 1410. As shown herein, the path illustrated by dashed line 1420 is exaggerated and for illustrative purposes only.

Figure 15:
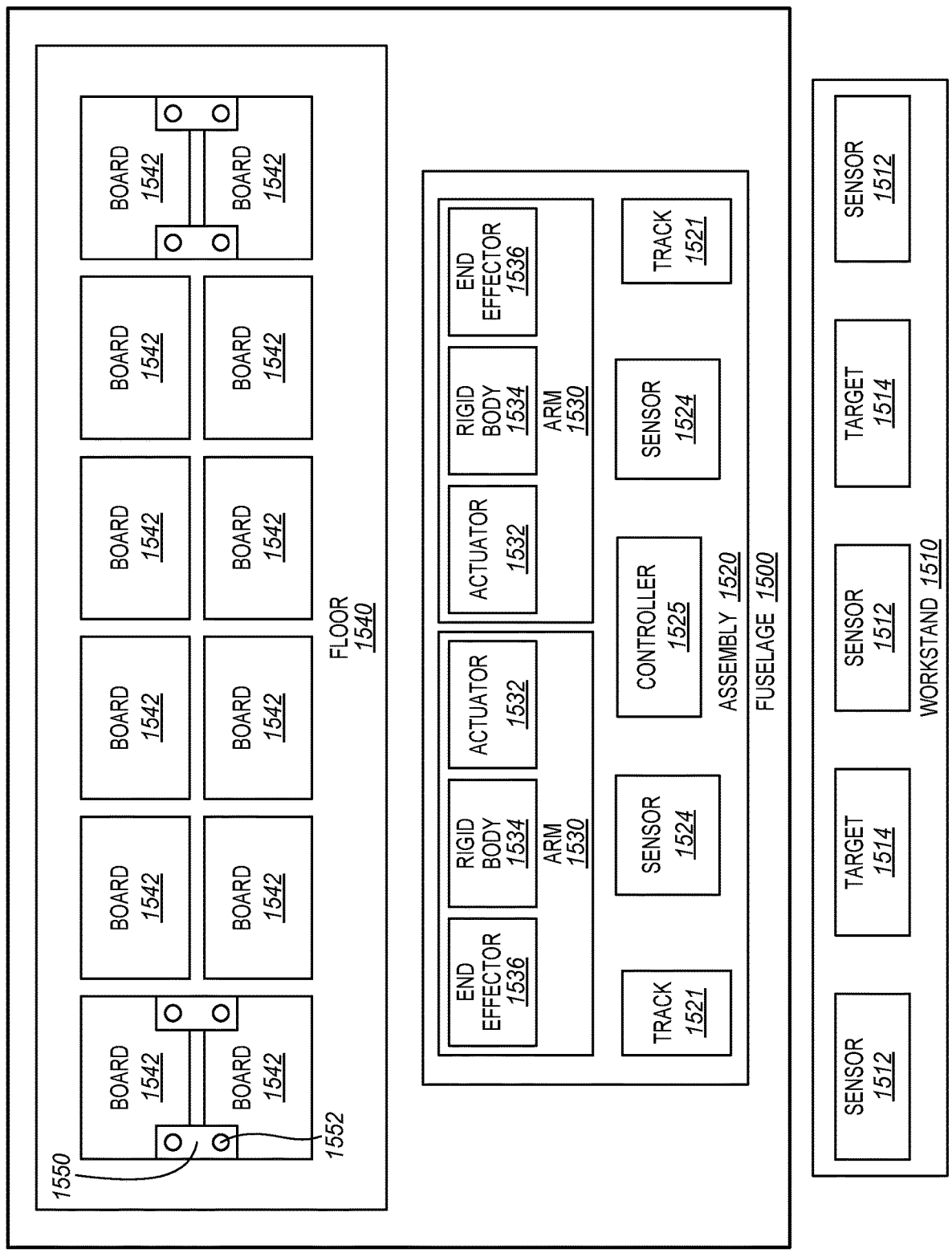
FIG. 15 is a block diagram of a tracked robot assembly operating within a fuselage in an exemplary embodiment.

FIG. 15 is a block diagram illustrating a system that includes a tracked robot assembly 1520 within a fuselage 1500 in an exemplary embodiment. As shown in FIG. 15, assembly 1520 may enter fuselage 1500 via workstand 1510, and may utilize sensors 1524 to track progress of assembly 1520 by detecting a distance to targets 1514. The operations of assembly 1520 are governed by controller 1525, which operates sensors 1524, and may further operate tracks 1521 as well as arms 1530. In this embodiment, arms 1530 each includes one or more actuators 1532 and rigid bodies 1534 that are used to position an end effector 1536. Assembly 1520 moves across floor 1540, which includes multiple floor boards 1542. Each floor board 1542 along the expected track path of assembly 1520 is attached to another floor board 1542 in the path via a mechanical interlock mechanism 1550. In this embodiment, each mechanical interlock mechanism 1150 is affixed to the boards 1542 via pins 1552. Upon completion of a movement along the path, workstand 1510 may utilize input from sensors 1512 in order to determine the actual location of assembly 400 within fuselage 1500.

Figure 16:
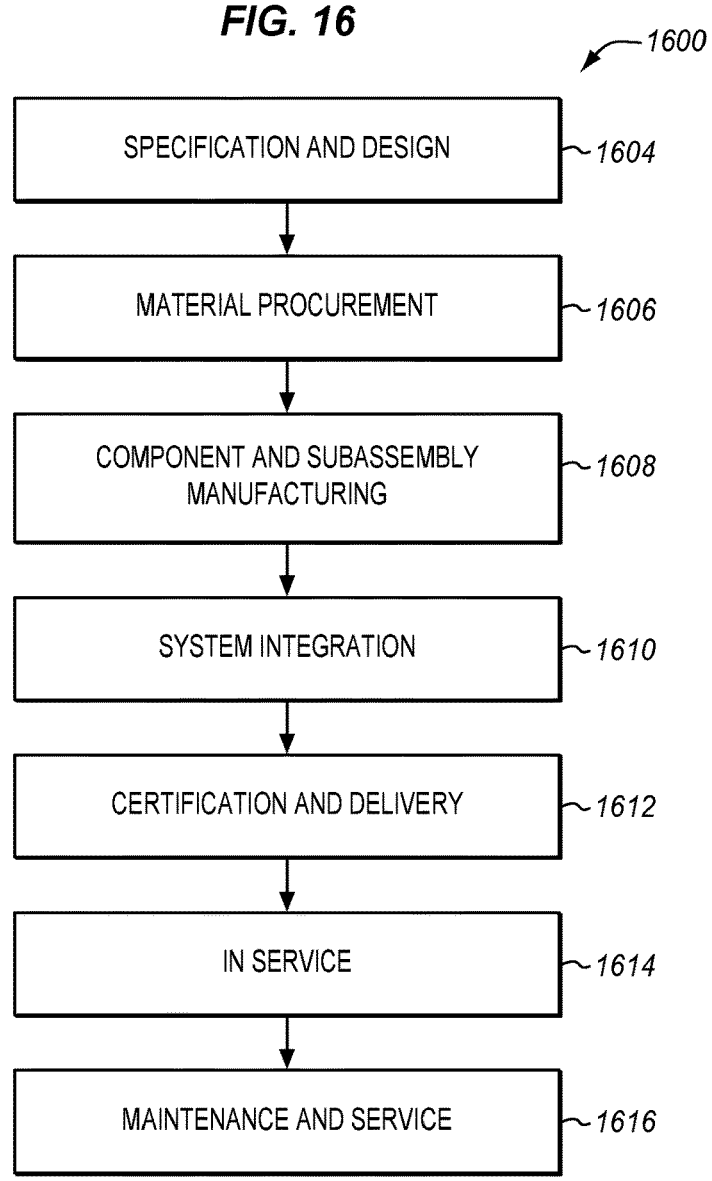
FIG. 16 is a flow diagram of aircraft production and service methodology in an exemplary embodiment.
Figure 17:
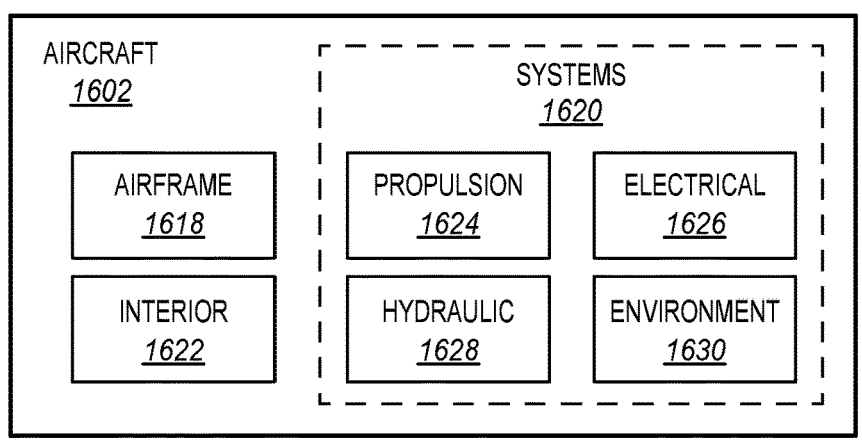
FIG. 17 is a block diagram of an aircraft in an exemplary embodiment.

Referring more particularly to the drawings, embodiments of the disclosure may be described in the context of an aircraft manufacturing and service method 1600 as shown in FIG. 16 and an aircraft 1602 as shown in FIG. 17. During pre-production, exemplary method 1600 may include specification and design 1604 of the aircraft 1602 and material procurement 1606. During production, component and subassembly manufacturing 1608 and system integration 1610 of the aircraft 1602 takes place. Thereafter, the aircraft 1602 may go through certification and delivery 1612 in order to be placed in service 1614. While in service by a customer, the aircraft 1602 is scheduled for routine maintenance and service 1616 (which may also include modification, reconfiguration, refurbishment, and so on). Apparatus and methods embodied herein may be employed during any one or more suitable stages of the production and service method 1600 (e.g., specification and design 1604, material procurement 1606, component and subassembly manufacturing 1608, system integration 1610, certification and delivery 1612, service 1614, maintenance and service 1616) and/or any suitable component of aircraft 1602 (e.g., airframe 1618, systems 1620, interior 1622, propulsion 1624, electrical 1626, hydraulic 1628, environmental 1630).

Each of the processes of method 1600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 17, the aircraft 1602 produced by exemplary method 1600 may include an airframe 1618 with a plurality of systems 1620 and an interior 1622. Examples of high-level systems 1620 include one or more of a propulsion system 1624, an electrical system 1626, a hydraulic system 1628, and an environmental system 1630. Any number of other systems may be included. Although an aerospace example is shown, the principles of the invention may be applied to other industries, such as the automotive industry.

As already mentioned above, apparatus and methods embodied herein may be employed during any one or more of the stages of the production and service method 1600. For example, components or subassemblies corresponding to production stage 1608 may be fabricated or manufactured in a manner similar to components or subassemblies produced while the aircraft 1602 is in service. Also, one or more apparatus embodiments, method embodiments, or a combination thereof may be utilized during the production stages 1608 and 1610, for example, by substantially expediting assembly of or reducing the cost of an aircraft 1602. Similarly, one or more of apparatus embodiments, method embodiments, or a combination thereof may be utilized while the aircraft 1602 is in service, for example and without limitation, to maintenance and service 1616. For example, the techniques and systems described herein may be used for steps 1606, 1608, 1610, 1614, and/or 1616, and/or may be used for airframe 1618 and/or interior 1622. These techniques and systems may even be utilized for systems 1620, including for example propulsion 1624, electrical 1626, hydraulic 1628, and/or environmental 1630.

In one embodiment, assembly 400 drives across temporary floor 701 to assemble a portion of airframe 1618 during component and subassembly manufacturing 1608. These portions may then be assembled into an aircraft in system integration 1610, and then be utilized in service 1614.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

The invention claimed is:

1. A method comprising:
disposing a mobile robot assembly having a defined fore portion, aft portion, left portion, and right portion, proximate to a fuselage of an aircraft that is being assembled;
facing the assembly in a fore direction at the fuselage;
aligning a left ranging sensor, that is attached to the left portion of the assembly, with a left target that is not attached to the assembly and separated from the assembly by a distance in an aft direction;
aligning a right ranging sensor, that is attached to the right portion of the assembly, with a right target that is not attached to the assembly and separated from the assembly by a distance in the aft direction;
directing the assembly to traverse to a location within the fuselage at which a robot on the assembly will perform work upon the fuselage;
determining a first distance between the left ranging sensor and the left target while the assembly is moving in the fore direction;
determining a second distance between the right ranging sensor and the right target while the assembly is moving in the fore direction;
detecting a difference between the determined distances; and
adjusting a direction of motion of the assembly based on the difference.

2. The method of claim 1 further comprising:
determining that the first distance is less than the second distance;
identifying a leftward angular deviation of the assembly from the fore direction based on the difference; and
instructing the assembly to turn rightward based on the angular deviation.

3. The method of claim 1 further comprising:
determining that the second distance is less than the first distance;
identifying a rightward angular deviation of the assembly from a fore direction at the fuselage based on the difference; and
instructing the assembly to turn leftward based on the angular deviation.

4. The method of claim 1 wherein:
the assembly includes multiple tracks, and
adjusting a direction of motion of the assembly comprises steering the assembly by driving one track a larger number of revolutions than another track.

5. The method of claim 1 further comprising:
iteratively determining the first distance, determining the second distance, detecting a difference in determined distances, and adjusting the direction of motion of the assembly as the assembly continues towards the location.

6. The method of claim 1 further comprising:
determining that the assembly has stopped moving;
utilizing an additional ranging sensor that is separate from the assembly to identify multiple targets on the assembly;
utilizing the additional ranging sensor to identify multiple targets on the fuselage;
comparing the targets on the assembly with the multiple targets on the fuselage to determine a proximity of the assembly to the location within the fuselage; and
instructing the assembly to reposition based on the proximity.

7. The method of claim 6 wherein:
instructing the assembly to reposition comprises directing the assembly to back up, adjust angle while backed up, and move towards the location within the fuselage again in order to adjust a lateral position of the assembly.

8. The method of claim 6 wherein:
instructing the assembly to reposition comprises directing the assembly to back up or move forward to adjust a longitudinal position of the assembly.

9. The method of claim 1 wherein:
disposing the assembly comprises disposing the assembly on a workstand that includes the left target and the right target.

10. The method of claim 1 further comprising:
installing temporary floor boards into the fuselage prior to disposing the assembly.

11. A non-transitory computer readable medium embodying programmed instructions which, when executed by a processor, are operable for performing a method of adjusting a position of a tracked robot assembly operating within a fuselage of an aircraft, the method comprising:
disposing a mobile robot assembly having a defined fore portion, aft portion, left portion, and right portion, proximate to a fuselage of an aircraft that is being assembled;
facing the assembly in a fore direction at the fuselage;
aligning a left ranging sensor, that is attached to the left portion of the assembly, with a left target that is not attached to the assembly and separated from the assembly by a distance in an aft direction;
aligning a right ranging sensor, that is attached to the right portion of the assembly, with a right target that is not attached to the assembly and separated from the assembly by a distance in the aft direction;
directing the assembly to traverse to a location within the fuselage at which a robot on the assembly will perform work upon the fuselage;
determining a first distance between the left ranging sensor and the left target while the assembly is moving in the fore direction;
determining a second distance between the right ranging sensor and the right target while the assembly is moving in the fore direction;
detecting a difference between the determined distances; and
adjusting a direction of motion of the assembly based on the difference.

12. The medium of claim 11 wherein the method further comprises:
determining that the first distance is less than the second distance;
identifying a leftward angular deviation of the assembly from the fore direction based on the difference; and
instructing the assembly to turn rightward based on the angular deviation.

13. The medium of claim 11 wherein the method further comprises:
determining that the second distance is less than the first distance;
identifying a rightward angular deviation of the assembly from a fore direction at the fuselage based on the difference; and
instructing the assembly to turn leftward based on the angular deviation.

14. The medium of claim 11 wherein:
the assembly includes multiple tracks, and
adjusting a direction of motion of the assembly comprises steering the assembly by driving one track a larger number of revolutions than another track.

15. The medium of claim 11 wherein the method further comprises:
iteratively determining the first distance, determining the second distance, detecting a difference in determined distances, and adjusting the direction of motion of the assembly as the assembly continues towards the location.

16. The medium of claim 11 wherein the method further comprises:
determining that the assembly has stopped moving;
utilizing an additional ranging sensor that is separate from the assembly to identify multiple targets on the assembly;
utilizing the additional ranging sensor to identify multiple targets on the fuselage;
comparing the targets on the assembly with the multiple targets on the fuselage to determine a proximity of the assembly to the location within the fuselage; and
instructing the assembly to reposition based on the proximity.

17. The medium of claim 16 wherein:
instructing the assembly to reposition comprises directing the assembly to back up, adjust angle while backed up, and move towards the location within the fuselage again in order to adjust a lateral position of the assembly.

18. The medium of claim 16 wherein:
instructing the assembly to reposition comprises directing the assembly to back up or move forward to adjust a longitudinal position of the assembly.

19. The medium of claim 11 wherein:
disposing the assembly comprises disposing the assembly on a workstand that includes the left target and the right target.

20. The medium of claim 11 wherein the method further comprises:
installing temporary floor boards into the fuselage prior to disposing the assembly.

\* \* \* \* \*